UNITED STATES PATENT OFFICE.

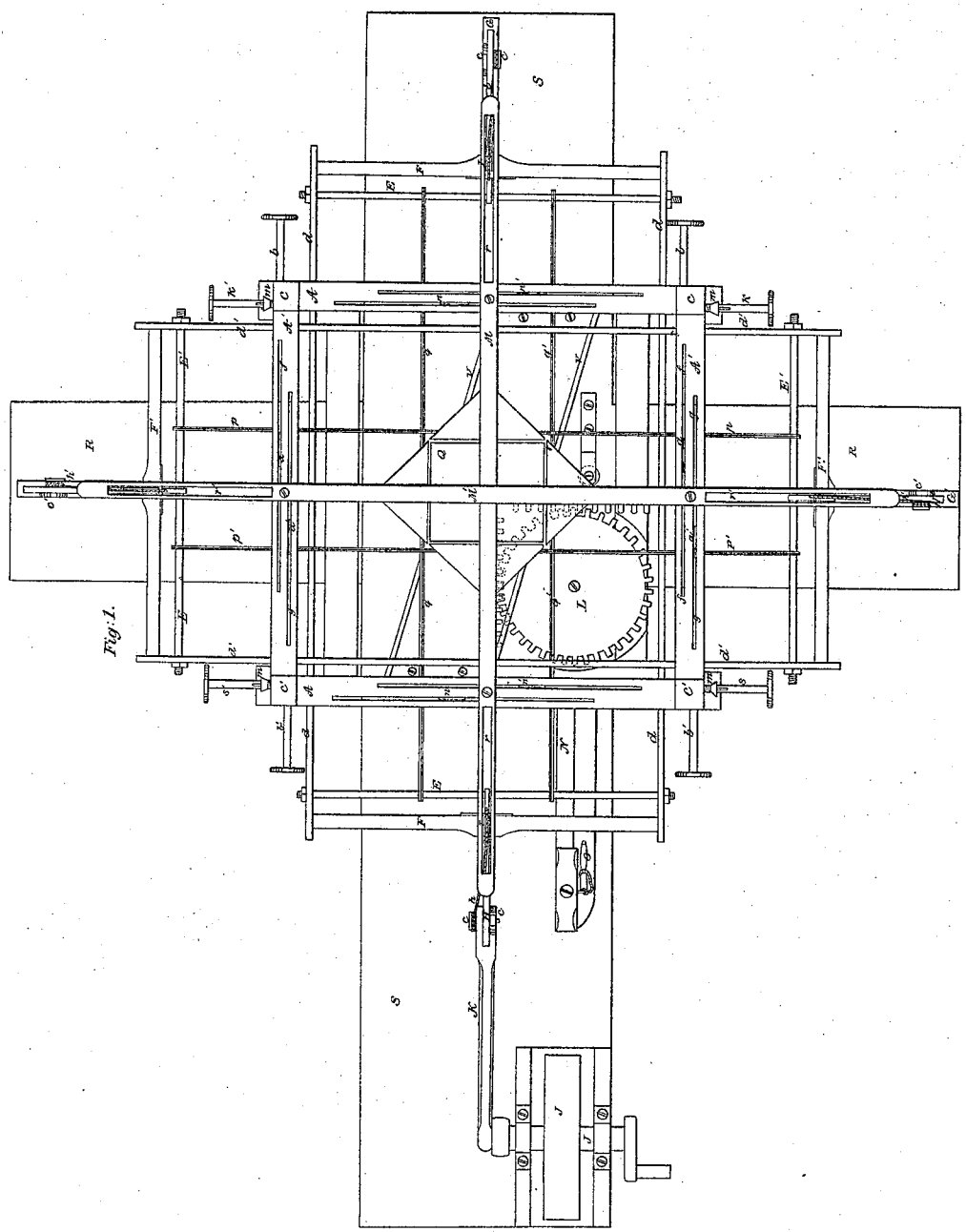

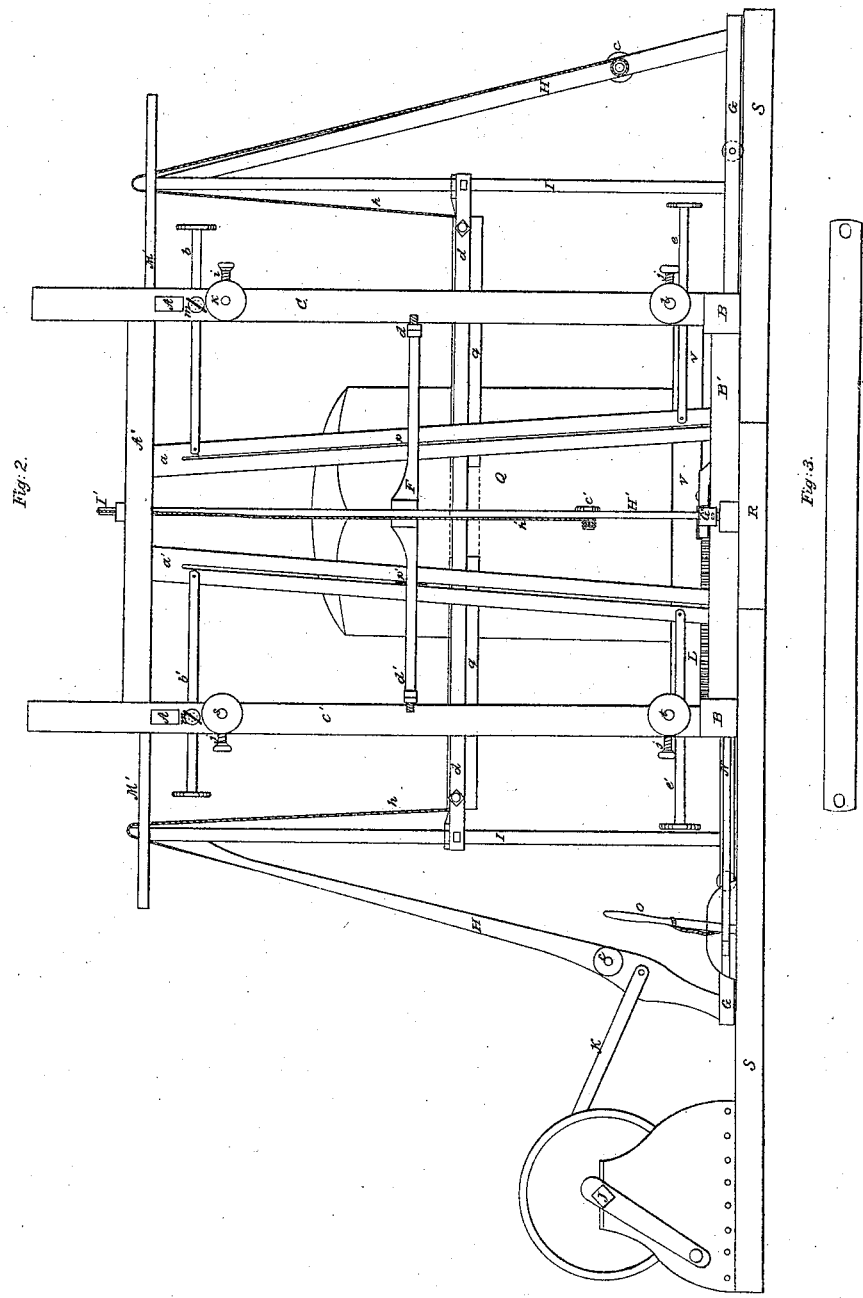

JOHN GRASON, OF QUEENSTOWN, MARYLAND.

MACHINE FOR SAWING STONE.

Specification of Letters Patent No. 15,230, dated July 1, 1856.

*To all whom it may concern:*

Be it known that I, JOHN GRASON, of Queenstown, in the county of Queen Anne and State of Maryland, have invented a new and Improved Machine for Sawing Blocks of Stone into a Pyramidal Form; and I do hereby declare that the following is a full and exact description thereof, reference being had to the accompanying drawings, making a part of this specification, Figure 1 being a top view of said machine, Fig. 2 a side elevation thereof, and Fig. 3 a side view of one of the saws, detached from the machine.
The frame of my improved stone sawing machine is composed of the corner posts C, C, C', C', the upper slotted beams A, A, and A', A', and the lower slotted beams B, B, and B', B'. The said frame may either be placed upon a broad floor, or upon a cross-shaped horizontal platform R, S, of sufficient extent to support and guide the projecting portions of the saw-frames. A track of rails $v$, $v$, may be run through the said frame, for the purpose of facilitating the operation of getting the block Q, into the proper position within the machine to be operated upon. The said block Q, should be firmly placed and secured in the center of the machine, when it is desired to saw it into a pyramidal shape at one operation.

The frame which carries the pairs of saws $q$, $q'$, is composed of the side bars $d$, $d$, the end pieces F, F, and the round metallic rods E, E. The frame which carries the pair of saws $p$, $p'$, is composed of the side bars $d'$, $d'$, the end pieces F', F', and the round metallic rods E', E'. The said round metallic rods E, and E', are combined with the side bars of the saw frames in such a manner that they can be readily unfastened and moved endwise to receive their respective saws, and then be replaced and secured again in their proper positions. The said rods E, and E', pass through slots in the saws, which causes the power in all cases to be exerted upon the forward ends of the saws to draw them forward, and thereby render it impossible for the saws to be bent by the means of the exertion of power at their after ends. The surfaces of the rods E, and E', are made perfectly smooth for the purpose of enabling the saws to slide freely upon them.

The slots $f$, in the front beams A', and B', of the frame of the machine, receive the ends of the slotted guiding plate $a$, which serves to guide the movements of the forward portion of the right hand saw $p$, while the rear end of said saw is guided by a slotted plate $a$, of corresponding shape, with the aforesaid plate $a$, and whose ends are placed in the slots $f$, $f$, in the rear upper and lower beams A', and B', of the frame of the machine. Near the upper and lower ends of the said slotted saw-guiding plates $a$, $a$, rods $b$, and $e$, are hinged thereto, which pass outward horizontally through apertures in the right hand front and rear corner posts C, C, of the frame of the machine. By means of set screws $m$, $m$, which pass into screw apertures in the aforesaid posts, opposite the sides of the rods $b$, and $e$, the said slotted guiding plates $a$, $a$, can be secured in any desired position.
The saw $p'$, is guided by the slotted plates $a'$, $a'$. The ends of the said slotted plates $a'$, $a'$, are received into the slots $g$, $g$, in the upper and lower front and rear beams A', and B', of the frame; and the upper and lower ends of said slotted plates $a'$, $a'$, are moved out and in by means of the rods $b'$, $b'$, and $e'$, $e'$, which are jointed thereto and thence pass outwardly through apertures in the left hand corner posts C', C';
and the said slotted plates may be secured in any desired position by means of the set screws $m$, $m$, acting against the sides of the said rods $b'$, $e'$.

The pair of slotted plates $n$, $n$, guide the movements of the saw $q$; and the pair of slotted plates $n'$, $n'$, guide the movements of the saw $q'$. The ends of the said slotted saw-guiding-plates $n$, $n$, $n'$, $n'$, are received into the slots in the side beams A, A, and B, B, of the frame of the machine; and the said plates are moved out or in and adjusted in any desired position, by means of the hinged rods $k$, $k'$, $l$, and $s$, $s'$, $t$, and are secured in any desired position by means of the series of set screws $i$, $j$, which act against the sides of the said hinged rods.

A reciprocating carrying frame composed of the rack-beam G, the uprights I, I, rising from said beam, and the braces H, H, which are combined with the outer extremities of the said rack-beam and with the upper ends of the uprights I, I, is combined with the saw-frame which carries the saws $q$, $q'$, in such a manner that the said saw frame can be moved vertically the entire length of the said uprights I, I: To wit: Mortises in the centers of the end-pieces F, F, of the said saw-frame, receive the uprights I, I, of the reciprocating frame; and cords, or chains h, connected to the said end-pieces F, F, pass upward over the upper ends of the uprights I, I, and then downward to windlasses c, c, which are combined with the braces H, H, as shown in Fig. 2, which arrangement enables the said saw-frame to be drawn up to the upper ends of the said uprights I, I.

When the saws are put in operation, brakes may be made to act upon the windlasses c, c, to prevent the entire weight of the saw-frame from acting on the saws, when deemed necessary; or the entire weight of the saw frame, and any additional weight, may be made to rest upon the operating saw edges when it may be deemed expedient. The upper ends of the uprights I, I, of the aforesaid reciprocating carrying frame, work in guiding slots r, r, in the beam M, which is secured to the top beams A, A, of the frame of the machine. The rack-beam G, of said frame, is guided by working in suitable bearings.

The reciprocating carrying frame, which is combined with the saw frame that carries the saws p, p', is composed of the rack-beam G', the uprights I', I', and the braces H', H', all of which parts are united with each other and combined with said saw-gate, in the same manner that the carrying frame G, I, I, H, H, is constructed and combined with the saw-gate that receives the saws q, q'—as hereinbefore set forth. The said rack-beam G', works in suitable supporting and guiding bearings in a direction at right angles to the movement of the rack-beam G, and the upper ends of the said uprights I', I', work in guiding slots r', r', in the beam M'.

A toothed wheel L, whose bearings are connected to the sliding beam N, is placed in such a position that it is at all times in gear with the rack-beam G, while it can be thrown into or out of gear with the rack-beam G', at any movement, by operating the lever O. The rack-beam G, is connected to a crank on the driving shaft J, by means of the pitman K. It will therefore be perceived that the reciprocating movement of the rack-beam G, imparts a corresponding movement to the rack-beam G', through the medium of the toothed wheel L.

In commencing the operation upon a block of stone, the rack-beam G', is thrown out of gear with the toothed wheel L, until after the saws q, q', have cut their way a little more than the depth of the width of said saws into the stone, then motion may be imparted to the said rack-beam G', and the saws p, p', which will cause all sides of an obelisk to be formed at one operation.

Having thus fully described my improved machine for sawing stone, I would state that I am aware that guides for governing the movements of saws in machines for reducing blocks of stone or marble to a tapering form, have been used, and therefore,

What I claim as my invention and desire to secure by Letters Patent, is—

Operating double sets of saws arranged at right angles with each other, by means of the power-moving rack-beam G, combined with the rack-beam G', by means of the toothed wheel L, which works upon the adjustable sliding beam N, substantially as herein set forth.

The above specification of my improvement in machines for sawing stones, signed and witnessed this 15th day of April 1856.

JOHN GRASON.

Witnesses:
Z. C. ROBBINS,
ARTH. C. WATKINS.